United States Patent
Watanabe et al.

(10) Patent No.: US 7,414,575 B2
(45) Date of Patent: Aug. 19, 2008

(54) POSITION CALCULATING APPARATUS, POSITION CALCULATING METHOD, AND PROGRAM

(75) Inventors: Takayuki Watanabe, Iwaki (JP); Kotaro Wakamatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 11/671,218

(22) Filed: Feb. 5, 2007

(65) Prior Publication Data

US 2007/0257837 A1 Nov. 8, 2007

(30) Foreign Application Priority Data

Feb. 6, 2006 (JP) ............................. 2006-027986

(51) Int. Cl.
- G01S 5/14 (2006.01)
- G01S 3/02 (2006.01)
- G01C 21/00 (2006.01)

(52) U.S. Cl. ............................. 342/357.14; 342/357.06; 701/213; 701/216

(58) Field of Classification Search ............ 342/357.02, 342/357.06, 357.12, 357.14; 701/207, 213–214, 701/216
See application file for complete search history.

(56) References Cited

U.S. PATENT DOCUMENTS

| 5,220,509 | A | 6/1993 | Takemura et al. |
| 6,298,286 | B1 | 10/2001 | Ying |
| 2003/0149512 | A1 | 8/2003 | Hrovat et al. |
| 2005/0242991 | A1 | 11/2005 | Montgomery et al. |

FOREIGN PATENT DOCUMENTS

| EP | 0875731 | | 4/1998 |
| EP | 1154281 | A | 11/2001 |
| JP | 10-307036 | | 11/1998 |
| JP | 2003-279362 | | 10/2003 |
| JP | 2004-150852 | | 5/2004 |
| WO | WO 02/086533 | | 10/2002 |

*Primary Examiner*—Dao L Phan
(74) *Attorney, Agent, or Firm*—Brinks Hofer Gilson & Lione (57) ABSTRACT

A position calculating apparatus that calculates a position of a moving body by using results of positioning by a GPS satellite and a self-contained sensor includes receiving means for receiving GPS orientation data measured by the GPS satellite and navigation orientation data measured by the self-contained sensor; first determining means for determining a reliability of the GPS orientation data; second determining means for determining a reliability of the navigation orientation data; and movement angle calculating means for calculating a movement angle of the moving body from the GPS orientation data or the navigation orientation data in accordance with the determination results of the first and second determining means.

18 Claims, 7 Drawing Sheets

| POSITIONING TIME | GPS POSITION [P_GPS] | GPS ORIENTATION [θ_GPS] | V_GPS | W_GPS | NAVIGATION ORIENTATION [θ_Gyro] | VEHICLE SPEED S |
|---|---|---|---|---|---|---|
| T1 | P1(x1,y1,z1) | θ1 | V1 | W1 | θ1−θ0 | S1 |
| T2 | P2(x2,y2,z2) | θ2 | V2 | W2 | θ2−θ1 | S2 |
| T3 | P3(x3,y3,z3) | θ3 | V3 | W3 | θ3−θ2 | S3 |
| ⋮ | ⋮ | ⋮ | ⋮ | ⋮ | ⋮ | ⋮ |
| Tn | Pn(xn,yn,zn) | θn | Vn | Wn | θn−θn−1 | Sn |

| TIME [s] | CALCULATED MOVEMENT ANGLE [deg] | GPS ORIENTATION [deg] | NAVIGATION ORIENTATION [deg] | DETERMINATION RESULT |
|---|---|---|---|---|
| 0 | 0 | 0 | 0 | USE GPS |
| 1 | 5 | 5 | +5 | USE GPS |
| 2 | 15 | 350 | +10 | USE Gyro |
| 3 | 30 | 30 | +12 | USE GPS |
| 4 | 48 | 200 | +18 | USE Gyro |
| 5 | 66 | 200 | +18 | USE Gyro |
| 6 | 78 | 200 | +12 | USE Gyro |
| 7 | 88 | 200 | +10 | USE Gyro |
| 8 | 90 | 90 | +5 | USE GPS |
| 9 | 90 | 90 | 0 | USE GPS |
| ⋮ | ⋮ | ⋮ | ⋮ | ⋮ |

FIG. 7

POSITION CALCULATING APPARATUS, POSITION CALCULATING METHOD, AND PROGRAM

1. RELATED APPLICATIONS

The present application claims priority to Japanese Patent Application Number 2006-027986, filed Feb. 6, 2006, the entirety of which is hereby incorporated by reference.

BACKGROUND OF THE INVENTION

1. Field of the Invention

The present invention relates to a position calculating apparatus that uses global positioning system (GPS) satellites and a self-contained sensor to calculate a position of a moving body and, more particularly, to a method of determining a movement angle of a moving body.

2. Description of the Related Art

Navigation apparatuses widely use GPS positioning that uses GPS satellites and self-contained navigation that uses, for example, gyro sensors or vehicle-speed sensors mounted in vehicles in order to calculate positions of the vehicles. The GPS positioning can detect absolute positions or orientations but the detection accuracy can be decreased depending on the reception environments. In contrast, the self-contained navigation does not depend on the reception environments but has the disadvantage of accumulated error. The navigation apparatuses use both the GPS positioning and the self-contained navigation in complementary fashion to calculate positions of the vehicles.

Japanese Unexamined Patent Application Publication No. 10-307036 relates to a hybrid navigator system that uses data from a self-contained sensor and a GPS device to yield navigation data about a moving body. The navigator system calculates the navigation data on the basis of data from the self-contained sensor and data received by the GPS device at the same positioning time. Since the GPS device is not provided with a calculation unit that calculates positional data including latitude, longitude, and orientation from the received data, unlike GPS devices in the related art, it is not necessary to perform a calculation for accommodating a difference in time between the data received from the self-contained sensor and the data received by the GPS device in the navigator system.

Japanese Unexamined Patent Application Publication No. 2003-279362 relates to a vehicle position correction device. The vehicle position correction device compares a traveling distance during a certain time period, yielded by self-contained navigation, with a distance between GPS positioning points during a time period corresponding to the certain time period, yielded by GPS positioning. If the difference between the traveling distance yielded by the self-contained navigation and the distance between the GPS positioning points is large, the vehicle position correction device determines that the GPS positioning data has a lower reliability. If the difference is small, the vehicle position correction device determines that the GPS positioning data has a higher reliability. The radius of an error circle indicating a range permitted for the GPS positioning error is decreased if the reliability is high while the radius is increased if the reliability is low.

Japanese Unexamined Patent Application Publication No. 2004-150852 relates to a satellite signal receiver. The satellite signal receiver adds a velocity vector $V_{n-1}$ yielded from the previous speed and speed orientation to the previously calculated position $X_{n-1}$ to calculate an estimated position $Y_n$, yields the current calculated position $Z_n$ at a positioning unit, and calculates the reliabilities of the estimated position $Y_n$ and the calculated position $Z_n$. Then, the satellite signal receiver yields a weight $T_n$ to be assigned to the estimated position $Y_n$ from the reliabilities of the estimated position $Y_n$ and the calculated position $Z_n$ to calculate a corrected position $X_n$. The satellite signal receiver calculates an optimal corrected position from the reliability of the calculated position and the reliability of the estimated position each time the positioning is performed so that the error in speed is not accumulated, in order to improve the positioning accuracy.

As disclosed in Japanese Unexamined Patent Application Publication No. 2004-150852, if the error in the orientation defining the velocity vector is large when the satellite signal receiver calculates the reliability of the estimated position, yielded by adding the velocity vector to the previous calculated position, and the reliability of the current calculated position at the positioning unit to determine the corrected position on the basis of the reliabilities, the error in the estimated position becomes large, thus reducing the accuracy of the corrected position. Accordingly, in order to increase the accuracy of the corrected position, it is necessary to improve the accuracy of the orientation or movement angle defining the velocity vector.

The speed orientation defining the velocity vector can be obtained from absolute orientation data yielded by GPS positioning or relative orientation data yielded by self-contained navigation. The absolute orientation data is yielded by Doppler shift. The absolute orientation data that is almost correct can be obtained in a case where the positioning is performed in a good positioning environment, as in the open air. However, the error in positioning becomes large in a case where the vehicle is stopped or in a case affected by, for example, multipath, as in a shielded environment. In contrast, the relative orientation data does not depend on the reception environment, unlike the GPS positioning, and offers a variation in orientation that is almost correct. However, the error is accumulated in the case of continuous use for a long time or in a ease where the orientation varies significantly, as in a winding route.

In order to overcome the disadvantages of both the absolute orientation data and the relative orientation data, it is desired that the orientation data having a higher reliability, of the absolute orientation data and the relative orientation data, be adopted for the velocity vector each time the positioning is performed.

SUMMARY OF THE INVENTION

Accordingly, it is an object of the present invention to provide a position calculating apparatus and a position calculating method, which are capable of using orientation data having a higher reliability to calculate a movement angle, a velocity vector, and a position of a moving body. It is another object of the present invention to provide a navigation system using the position calculating apparatus with a higher positional accuracy.

According to an embodiment of the present invention, a position calculating apparatus that calculates a position of a moving body by using the results of positioning by a GPS satellite and a self-contained sensor includes receiving means for receiving GPS orientation data measured by the GPS satellite and navigation orientation data measured by the self-contained sensor; first determining means for determining a reliability of the GPS orientation data; second determining means for determining a reliability of the navigation orientation data; and movement angle calculating means for calculating a movement angle of the moving body from the GPS orientation data or the navigation orientation data in accordance with the determination results by the first and second determining means.

The first determining means preferably uses at least one of a plurality of conditions including a positioning state of the GPS satellite, a distance ratio between a traveling distance obtained from the results of the positioning by the GPS satellite and a traveling distance obtained from the results of the positioning by the self-contained sensor, a difference in movement angle between an angle between two points measured by the GPS satellite and the GPS orientation data, a similarity between the GPS orientation data and the navigation orientation data, and an estimated range with respect to the previous movement angle to determine the reliability of the GPS orientation data.

According to another embodiment of the present invention, a method of calculating a position of a moving body by using the results of the positioning by a GPS satellite and a self-contained sensor includes the steps of receiving GPS orientation data measured by the GPS satellite and navigation orientation data measured by the self-contained sensor; determining which orientation data has a higher reliability from a comparison of the reliability of the GPS orientation data with the reliability of the navigation orientation data; and calculating a movement angle of the moving body from either the GPS orientation data or the navigation orientation data which is determined to have a higher reliability.

The determining step preferably includes a first determining step of determining the reliability of the GPS orientation data on the basis of a first condition, a second determining step of determining the reliability of the navigation orientation data on the basis of a second condition if the first determining step determines that the GPS orientation data is reliable, a third determining step of determining the reliability of the GPS orientation data on the basis of a third condition if the second determining step determines that the navigation orientation data is not reliable, and a fourth determining step of determining the reliability of the GPS orientation data on the basis of a fourth condition if the third determining step determines that the GPS orientation data is not reliable. The calculating step preferably calculates the movement angle on the basis of the navigation orientation data if the first determining step determines that the GPS orientation data is not reliable and if the fourth determining step determines that the GPS orientation data is not reliable and calculates the movement angle on the basis of the GPS orientation data otherwise.

According to another embodiment of the present invention, a program, for a navigation system, of calculating a position of a moving body by using the results of positioning by a GPS satellite and a self-contained sensor includes the steps of receiving GPS orientation data measured by the GPS satellite and navigation orientation data measured by the self-contained sensor; determining which orientation data has a higher reliability from a comparison of the reliability of the GPS orientation data with the reliability of the navigation orientation data; and calculating a movement angle of the moving body from either the GPS orientation data or the navigation orientation data which is determined to have a higher reliability.

According to the present invention, since the GPS orientation data or the navigation orientation data, which has a higher reliability at the positioning time, is adopted to calculate the movement angle, error in the movement angle is reduced. Consequently, it is possible to increase the accuracy of the velocity vector to accurately calculate the position Further features of the present invention will become apparent from the following description of exemplary embodiments with reference to the attached drawings.

DESCRIPTION OF THE PREFERRED EMBODIMENTS

Preferred embodiments of the present invention will now be described with reference to the attached drawings. A position calculating apparatus according to an embodiment of the present invention may be used in an in-vehicle navigation system.

Figure 1:
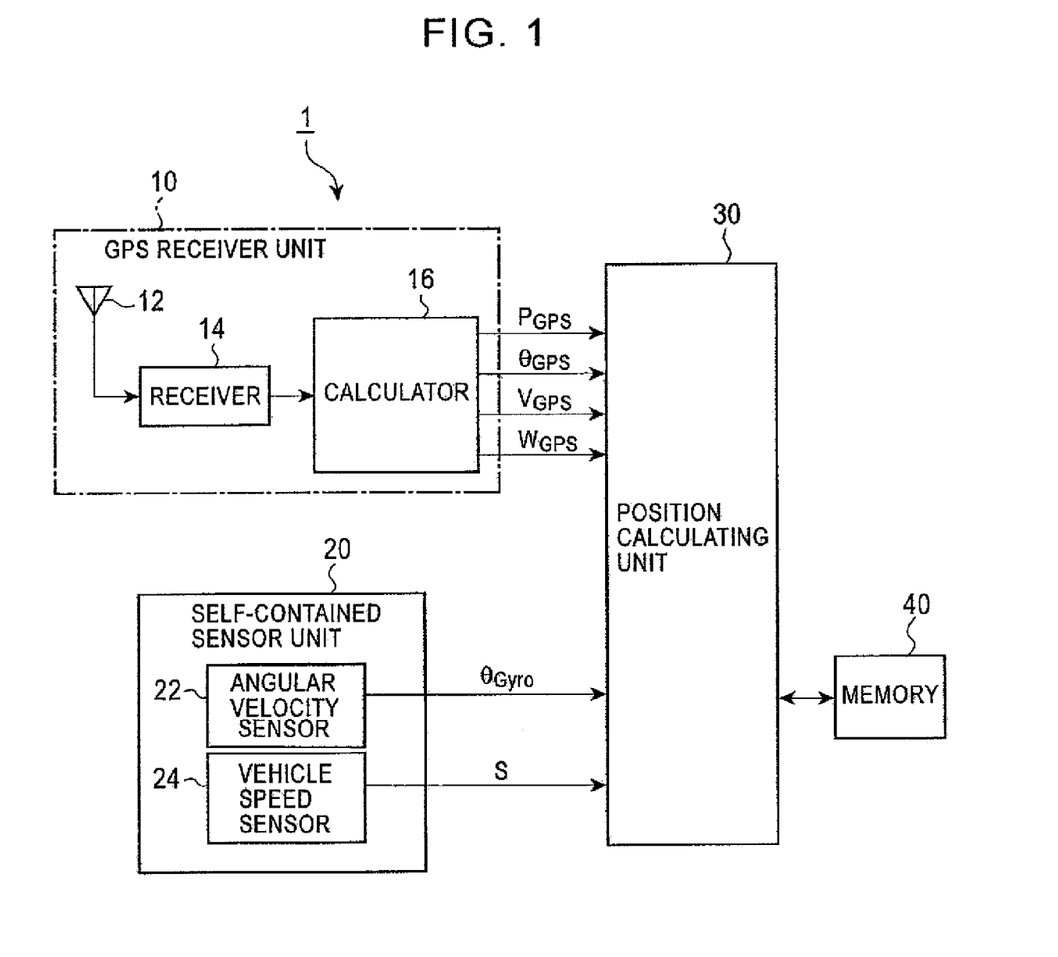
FIG. 1 is a block diagram showing an example of the structure of a position calculating apparatus according to an embodiment of the present invention.

FIG. 1 is a block diagram showing an example of the structure of a position calculating apparatus 1 according to an embodiment of the present invention. The position calculating apparatus 1 includes a GPS receiver unit 10, a self-contained sensor unit 20, a position calculating unit 30, and a memory 40. The GPS receiver unit 10 receives a GPS signal transmitted from a GPS satellite to produce data concerning the absolute position, absolute orientation using Doppler shift, and speed of the vehicle. The self-contained sensor unit 20 produces data concerning the relative orientation and traveling distance detected by various sensors mounted in the vehicle. The position calculating unit 30 receives the data from the GPS receiver unit 10 and the data from the self-contained sensor unit 20 to calculate a movement angle and a vehicle position of the moving body on the basis of the received data. The memory 40 has travel history information and so on stored therein.

The GPS receiver unit 10 includes a GPS receiver antenna 12, a receiver 14, and a calculator 16. The calculator 16 produces an absolute position $P_{GPS}$ (hereinafter referred to as a GPS position), an absolute orientation $\theta_{GPS}$ (hereinafter referred to as a GPS orientation), and a GPS velocity $V_{GPS}$ for every predetermined positioning time (for example, one second) and also produces a positioning state signal $W_{GPS}$ indicating the positioning state of the GPS satellite.

The self-contained sensor unit 20 includes an angular velocity sensor 22, such as a gyro sensor, detecting the rotation angle of the vehicle. The angular velocity sensor 22 produces a relative orientation $\theta_{Gyro}$ (hereinafter referred to as a "navigation orientation"). The self-contained sensor unit 20 also includes a vehicle speed sensor 24 generating a pulse signal each time the vehicle travels a predetermined distance. The vehicle speed sensor 24 produces a vehicle speed S.

The position calculating unit 30 is, for example, a microcomputer. The position calculating unit 30 calculates a position by using programs stored in a read only memory (ROM) or a random access memory (RAM). The history information calculated by the position calculating unit 30 is sequentially stored in the memory 40.

Figure 2:
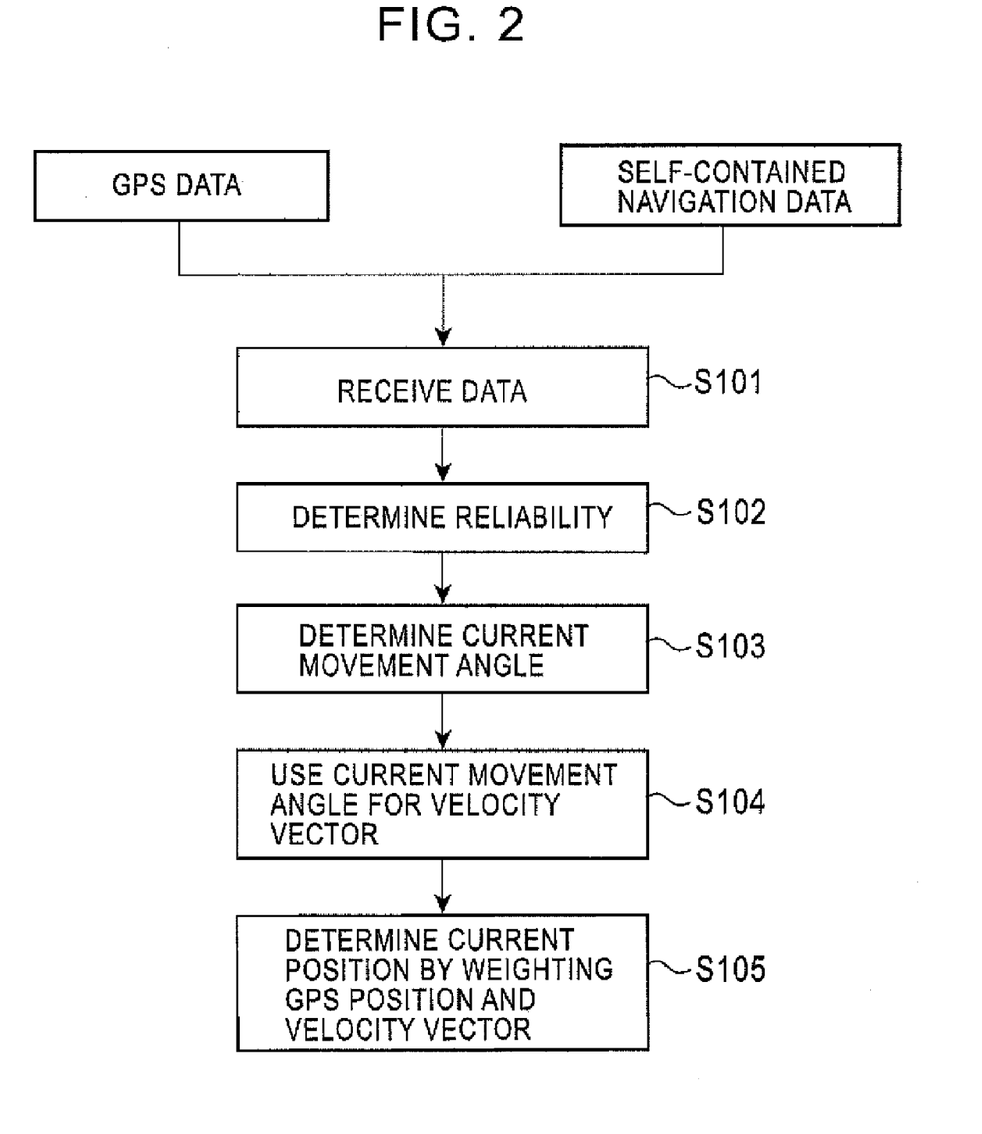
FIG. 2 is a flowchart showing an operation of the position calculating unit according to the embodiment of the present invention.
Figure 3A:
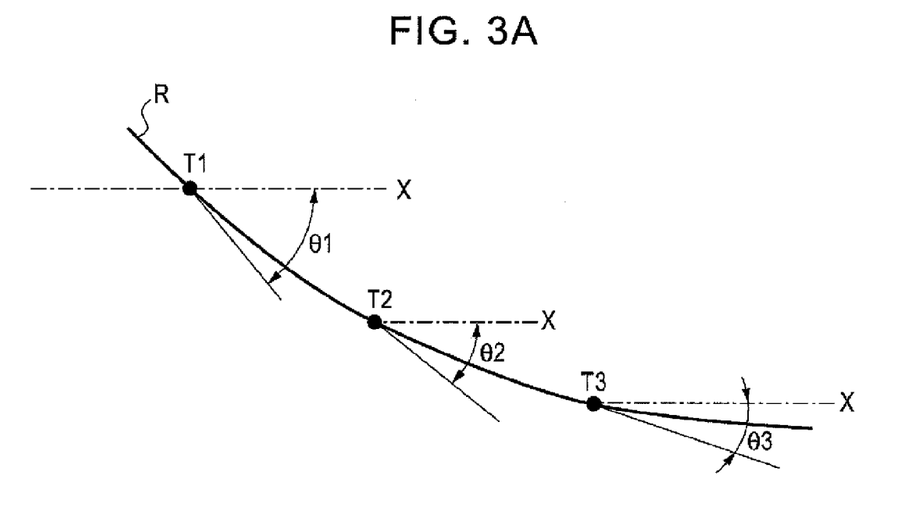
FIGS. 3A and 3B illustrate GPS data and self-contained navigation data.
Figure 3B:
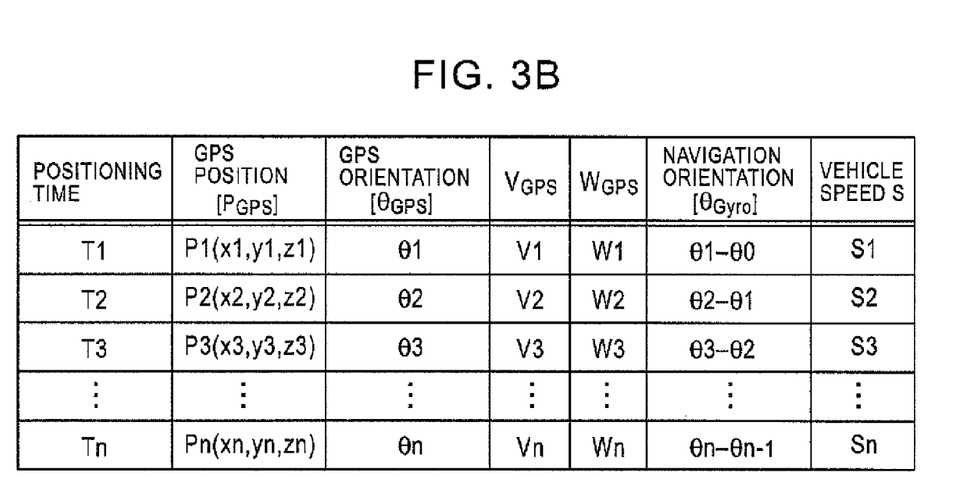

FIG. 2 is a flowchart showing an operation of the position calculating unit 30 according to the embodiment of the present invention. In Step S101, the position calculating unit 30 receives GPS data measured by the GPS receiver unit 10 and self-contained navigation data measured by the self-contained sensor unit 20. FIGS. 3A and 3B illustrate the GPS data and the self-contained navigation data. As shown in FIG. 3A, when a vehicle moves on a road R, the position calculating unit 30 receives the GPS data and the self-contained navigation data at positioning times T1, T2, ... Tn. As shown in FIG. 3B, the GPS data includes the GPS position $P_{GPS}$ the GPS orientation $\theta_{GPS}$, the GPS velocity $V_{GPS}$, and the positioning state signal $W_{GPS}$. The GPS positions P1, P2, ... Pn indicate latitudes, longitudes, and altitudes for three-dimensional positioning and indicate latitudes and longitudes for two-dimensional positioning. The GPS orientations θ1, θ2, ... θn indicate angles with reference to a reference direction, for example, angles clockwise from the X direction in FIG. 3A. The GPS velocities V1, V2, ... Vn indicate the relative speeds of the vehicle with reference to the GPS satellite. The positioning state signals W1, W2, ... Wn indicate whether the three-dimensional GPS positioning is adopted and whether the GPS positioning is available or not. The GPS orientation $\theta_{GPS}$ and the GPS velocity $V_{GPS}$ are yielded by the Doppler shift.

The self-contained navigation data includes the navigation orientation $\theta_{Gyro}$ and the vehicle speed S. The navigation orientation $\theta_{Gyro}$ produced by the angular velocity sensor 22 indicates a relative angle, that is, an amount of variation θn-θn-1 in orientation during a positioning period. The speeds S1, S2, ..., Sn produced by the vehicle speed sensor 24 indicate the vehicle speeds during the positioning periods. The GPS data and the self-contained navigation data are temporarily stored in a register in the position calculating unit 30, and the stored data is used to calculate positions.

Referring back to FIG. 2, in Step S102, the position calculating unit 30 extracts the GPS orientation $\theta_{GPS}$ and the navigation orientation $\theta_{Gyro}$ from the received GPS data and self-contained navigation data to determine the reliability of the extracted orientations. The reliability is determined on the basis of whether the GPS orientation and the navigation orientation meet predetermined conditions. Although described in detail below, the conditions include a positioning state of the GPS satellite, the distance ratio between a traveling distance yielded in the positioning by the GPS satellite and a traveling distance yielded in the positioning by the self-contained sensor, a difference in movement angle between an angle between two points measured by the GPS satellite and the GPS orientation data, the similarity between the GPS orientation data and the navigation orientation data, an estimated range with respect to the previous movement angle, and so on. In Step S103, the position calculating unit 30 selects the GPS orientation or the navigation orientation, depending on the result of the determination of the reliability, to determine the current movement angle.

Figure 4A:
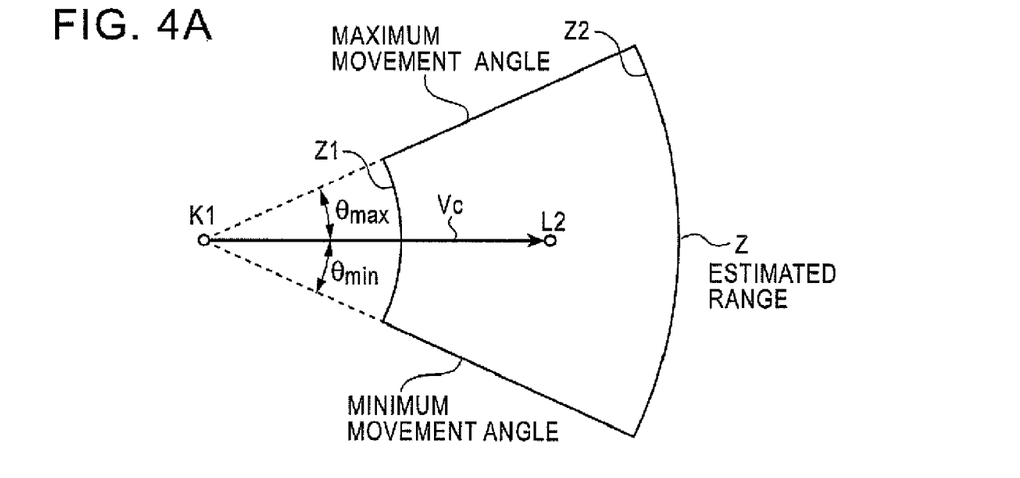
FIGS. 4A to 4C illustrate a method of determining a position.

In Step S104, the position calculating unit 30 uses the calculated current movement angle to calculate a velocity vector. In Step S105, the position calculating unit 30 weights the GPS position and the velocity vector to determine the current position. A method of determining the current position will now be described with reference to FIGS. 4A and 4B. As shown in FIG. 4A, when the previous position at the positioning time T1 is denoted by "K1", a velocity vector Vc defined by the previous movement angle and the previous vehicle speed (or the GPS velocity) is added to the previous position K1 to yield an estimated position L2 at the positioning time T2.

Then, an estimated range Z is determined concentrically with the previous position K1. The arc length of the estimated range Z is defined by a maximum movement angle $\theta_{max}$ and a minimum movement angle $\theta_{min}$. The magnitudes of the maximum movement angle $\theta_{max}$ and the minimum movement angle $\theta_{min}$ are determined with reference to the previous movement angle in accordance with the previous speed. The distance in the radius direction of the estimated range Z is defined by a minimum traveling distance Z1 and a maximum traveling distance Z2. The difference between the minimum traveling distance Z1 and the maximum traveling distance Z2 is set on the basis of the previous vehicle speed. The magnitudes of the maximum movement angle $\theta_{max}$ and the minimum movement angle $\theta_{min}$ and the difference between the minimum traveling distance Z1 and the maximum traveling distance Z2 are determined by referring to the past measured data.

Figure 4B:
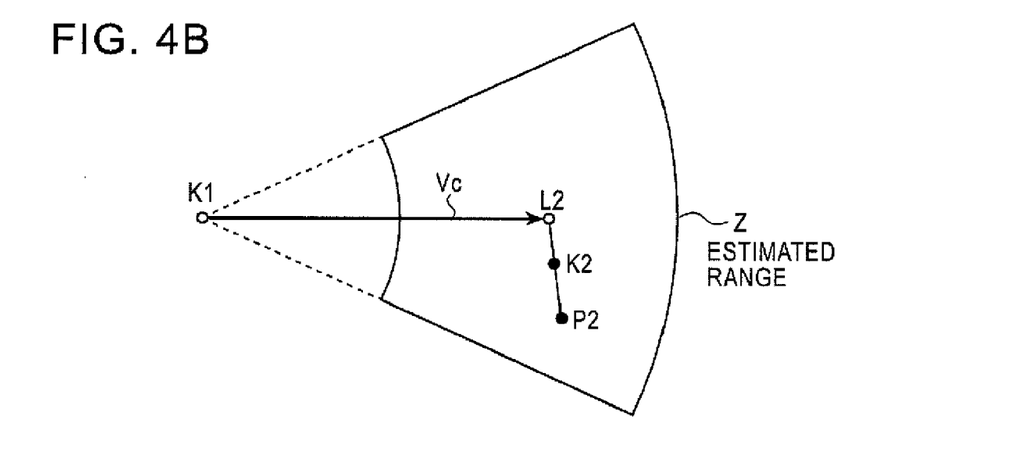
Figure 4C:
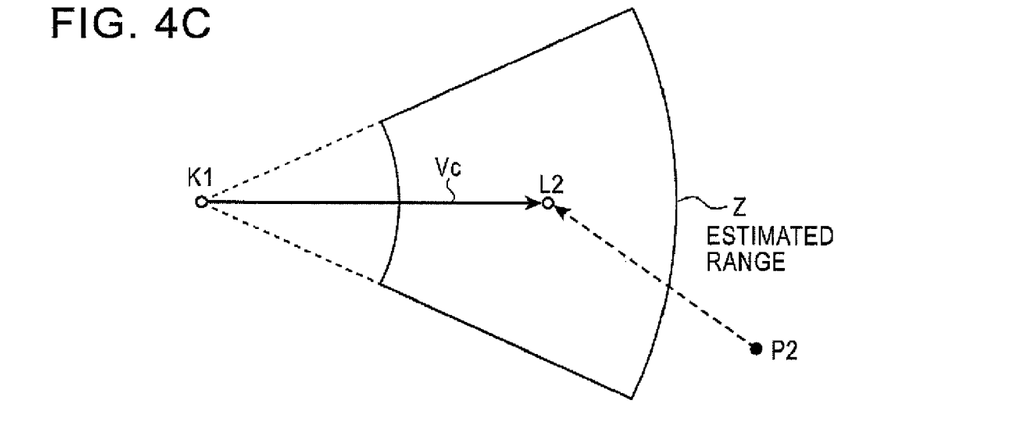

As shown in FIG. 4B, if the GPS position P2 at the positioning time T2 is within the estimated range Z, a certain weight is given to the straight line between the GPS position P2 and the estimated position L2 to determine the current position K2. The weight is determined by, for example, the reliability of the GPS orientation. In contrast, as shown in FIG. 4C, if the GPS position P2 at the positioning time T2 is not within the estimated range Z, the GPS position P2 is drawn toward the estimated position L2 to determine the estimated position L2 to be the current position K2. The velocity vector Vc defined by the current movement angle and the current vehicle speed is added to the current position K2 to calculate an estimated position L3 at the positioning time T3.

The determination of the reliability in Step S102 in FIG. 2 and the determination of the movement angle in Step S103 in FIG. 2 will now be described with reference to a flowchart shown in FIG. 5. The position calculating apparatus according to the embodiment of the present invention calculates a position by the GPS positioning during normal operation and by the self-contained navigation otherwise. However, this operation method is only an example and the operation method is not necessarily limited to this.

Figure 5:
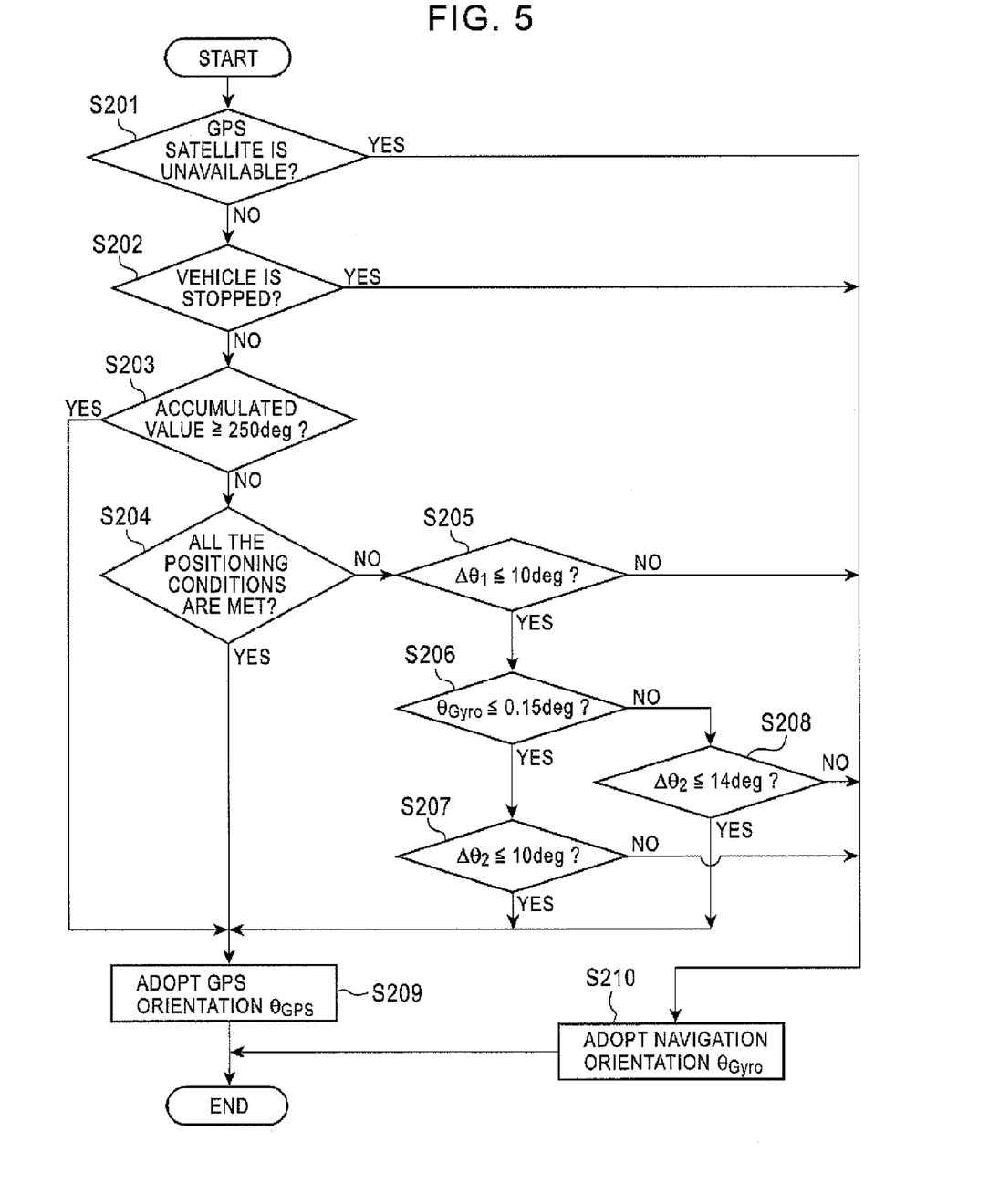
FIG. 5 is a flowchart showing a process of determining the reliability of a GPS orientation and a navigation orientation.

Referring to FIG. 5, in Steps S201 and S202, the position calculating unit 30 determines the reliability of the GPS orientation $\theta_{GPS}$. Specifically, in Step S201, the position calculating unit 30 receives a positioning state signal Wt from the GPS receiver unit 10 at a positioning time Tt and determines whether the GPS satellite is unavailable on the basis of the positioning state signal Wt. If the GPS satellite is unavailable, then in Step S210, the position calculating unit 30 adopts the navigation orientation $\theta_{Gyro}$ to determine the current movement angle. If the GPS satellite is available, then in Step S202, the position calculating unit 30 determines whether the vehicle is stopped. If the vehicle is stopped, then in Step S210, the position calculating unit 30 adopts the navigation orientation $\theta_{Gyro}$ to determine the current movement angle. The determination of whether the vehicle is stopped is based on the output of the vehicle speed pulse or the GPS velocity.

If the position calculating unit 30 determines that the GPS orientation $\theta_{GPS}$ is reliable in Steps S201 and S202, the position calculating unit 30 then determines the reliability of the navigation orientation $\theta_{Gyro}$. Specifically, in Step S203, the position calculating unit 30 determines whether variation in the navigation orientation $\theta_{Gyro}$ has accumulated to a predetermined threshold or more. If the variation in the navigation orientation $\theta_{Gyro}$ has accumulated to the predetermined threshold or more, the position calculating unit 30 determines that the navigation orientation $\theta_{Gyro}$ has a lower reliability and, in Step S209, the position calculating unit 30 adopts the GPS orientation $\theta_{GPS}$ to determine the current movement angle. A large amount of the accumulated variation in the navigation orientation $\theta_{Gyro}$ means accumulated error. In the accumulation of the variation in the navigation orientation $\theta_{Gyro}$, the variation in the navigation orientation $\theta_{Gyro}$ is added only when the navigation orientation $\theta_{Gyro}$ is adopted to determine the movement angle, while it is cleared when the GPS orientation $\theta_{GPS}$ is adopted to determine the movement angle.

If the accumulated variation in the navigation orientation $\theta_{Gyro}$ is a value below the threshold, then in Step S204, the position calculating unit 30 determines whether the following positioning conditions are met. If the positioning conditions are met, the position calculating unit 30 determines that the GPS orientation $\theta_{GPS}$ is reliable and, in Step S209, the position calculating unit 30 adopts the GPS orientation $\theta_{GPS}$ to determine the current movement angle.

(1) The GPS positioning state is three-dimensional positioning. In this state, signals are received from at least four GPS satellites. The three-dimensional positioning has an accuracy higher than that of two-dimensional positioning.

(2) The GPS velocity VGPS is higher than or equal to a threshold (for example, 20 Km/h). The accuracy of the GPS orientation $\theta_{GPS}$ is decreased at a lower GPS velocity.

(3) The traveling distance ratio is within a predetermined range (for example, $0.9 \leq$ the traveling distance ratio $\leq 1.1$). The traveling distance ratio is the ratio between the traveling distance yielded from the GPS position and the traveling distance yielded from the vehicle speed pulse. The accuracy of the GPS positioning data is increased as the traveling distance ratio becomes close to one.

(4) The difference in the movement angle is smaller than or equal to a threshold (for example, the difference in the movement angle $\leq 30°$). The difference in the movement angle is between the angle between two OPS positions and the GPS orientation. The accuracy of the GPS positioning data is increased as the difference in the movement angle becomes close to zero.

If all of the above positioning conditions (1) to (4) are met, then in Step S209, the position calculating unit 30 adopts the GPS orientation $\theta_{GPS}$ to determine the current movement angle.

If any one of the above positioning conditions (1) to (4) is not met, the position calculating unit 30 determines again whether the GPS orientation $\theta_{GPS}$ is reliable. At this time, the position calculating unit 30 determines the similarity between the GPS orientation $\theta_{GPS}$ and the navigation orientation $\theta_{Gyro}$ and determines whether the GPS orientation $\theta_{GPS}$ is within an estimated range given by adding a variation in the navigation orientation $\theta_{Gyro}$ to the previous movement angle.

In Step S205, the position calculating unit 30 determines the similarity between the GPS orientation $\theta_{GPS}$ and the navigation orientation $\theta_{Gyro}$ according to Equation (1):

$$\Delta\theta_1 = |(\theta_{GPS1} - \theta_{GPS2}) - \theta_{Gyro}| \leq 10° \qquad (1)$$

where $\theta_{GPSs1}$ denotes the current GPS movement angle, $\theta_{GPS2}$ denotes the previous GPS movement angle, and $\theta_{Gyro}$ denotes the current variation in the navigation orientation $\theta_{Gyro}$.

If the $\Delta\theta_1$ exceeds 10°, the position calculating unit 30 determines that there is no similarity between the GPS orientation $\theta_{GPS}$ and the navigation orientation $\theta_{Gyro}$ and the GPS orientation $\theta_{GPS}$ is not reliable and, in Step S210, the position calculating unit 30 adopts the navigation orientation $\theta_{Gyro}$ to determine the current movement angle.

If the position calculating unit 30 determines that there is similarity between the GPS orientation $\theta_{GPS}$ and the navigation orientation $\theta_{Gyro}$, the position calculating unit 30 determines whether the GPS orientation $\theta_{GPS}$ is within an estimated range. Since the estimated range depends on the linearity of the vehicle, the position calculating unit 30 determines in Step S206 whether the movement of the vehicle is linear. For example, the position calculating unit 30 determines whether $\theta_{Gyro} \leq 0.15°$. If $\theta_{Gyro} \leq 0.15°$, the position calculating unit 30 determines that the movement of the vehicle is linear. In Step S207, the position calculating unit 30 determines whether the GPS orientation $\theta_{GPS}$ is within an estimated range according to Equation (2):

$$\Delta\theta_2 = |\theta_{GPS1} - (\theta_{t-1} + \theta_{Gyro})| \leq 10° \qquad (2)$$

where $\theta_{t-1}$ denotes the previous movement angle.

As shown in Equation (2), the position calculating unit 30 sets the estimated range within which the difference between the result of addition of the current navigation orientation $\theta_{Gyro}$ to the previous movement angle $\theta_{t-1}$ and the GPS orientation $\theta_{GPS}$ is not larger than 10°. If the current GPS orientation $\theta_{GPS}$ is within the estimated range, the position calculating unit 30 determines that the GPS orientation $\theta_{GPS}$ is reliable and, in Step S209, the position calculating unit 30 adopts the GPS orientation $\theta_{GPS}$ to determine the current movement angle. If the GPS orientation $\theta_{GPS}$ is not within the current movement angle, then in Step S210, the position calculating unit 30 adopts the navigation orientation $\theta_{Gyro}$ to determine the current movement angle. If the position calculating unit 30 determines in Step S206 that the movement of the vehicle is not linear, then in Step S208, the position calculating unit 30 determines whether the GPS orientation $\theta_{GPS}$ is within an estimated range according to Equation (3):

$$\Delta\theta_2 = |\theta_{GPS1} - (\theta_{t-1} + \theta_{Gyro})| \leq 14° \qquad (3)$$

where $\theta_{t-1}$ denotes the previous movement angle.

In this case, the estimated range is set to a range that is 14 degrees around the previous movement angle. If the GPS orientation $\theta_{GPS}$ is within the estimated range, the GPS orientation $\theta_{GPS}$ is adopted to determine the current movement angle. If the GPS orientation $\theta_{GPS}$ is not within the estimated range, the navigation orientation $\theta_{Gyro}$ is adopted to determine the current movement angle. The validity of the GPS orientation $\theta_{GPS}$ is determined by using the estimated range in the above manner. If the variation in the navigation orientation $\theta_{Gyro}$ is close to zero, it may be determined that the movement of the vehicle is linear to decrease the threshold or to narrow the estimated range.

The reliability of the GPS orientation $\theta_{GPS}$ is compared with that of the navigation orientation $\theta_{Gyro}$ and the movement angle is determined by using the orientation data having a higher reliability in the manner described above. The determined movement angle is used for the velocity vector, as shown in FIG. 2, to determine the current position. The current movement angle and the calculated position are stored in the memory 40. The stored current movement angle and calculated position are used for the subsequent calculation of the position.

Figure 6:
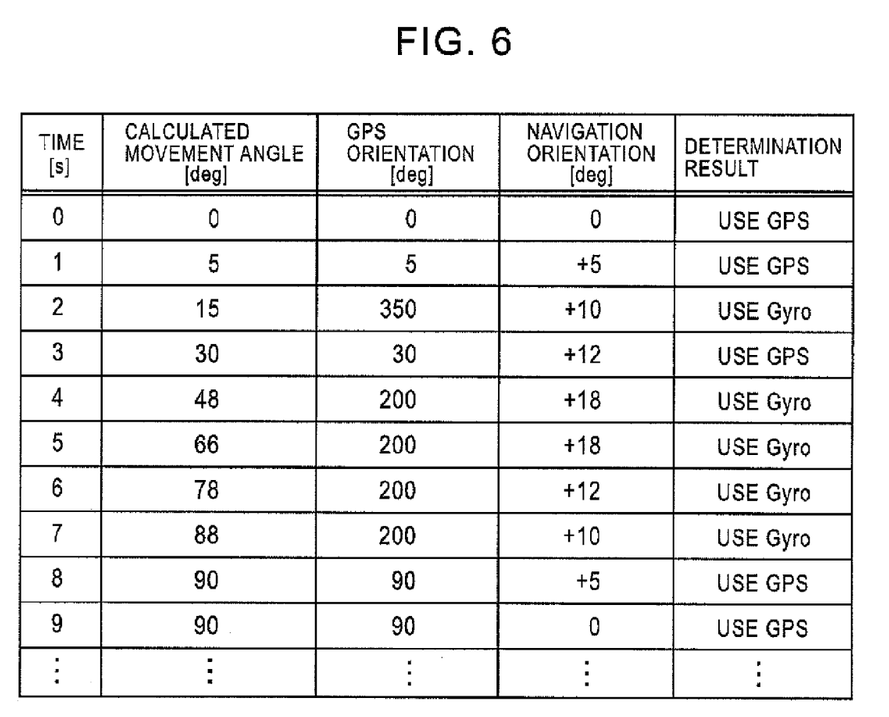
FIG. 6 is a table showing determination results of the reliability of the GPS orientation and the navigation orientation and examples of determined movement angles.

FIG. 6 is a table showing determination results of the reliability of GPS orientation $\theta_{GPS}$ and the navigation orientation $\theta_{Gyro}$ and examples of the determined movement angles. Referring to FIG. 6, the GPS orientation $\theta_{GPS}$ is adopted at times 0 and 1 while the navigation orientation $\theta_{Gyro}$ is adopted at time 2. The reliability of the GPS orientation $\theta_{GPS}$ is compared with that of the navigation orientation $\theta_{Gyro}$ for every positioning time and the movement angle is determined by using the orientation data having a higher reliability.

According to the embodiment of the present invention, the filtering process in which the GPS orientation data and the navigation orientation data (gyro relative orientation data) are used to determine the direction of the velocity vector has the following advantages.

(1) When the vehicle is stopped, the use of the navigation orientation $\theta_{Gyro}$ allows a decrease in the accuracy of the movement angle to be suppressed.

(2) When the navigation orientation $\theta_{Gyro}$ is used for a long time, the use of the GPS orientation $\theta_{GPS}$ allows the accumulation of error in the movement angle to be suppressed.

(3) When the reception state of the GPS is good, the use of the GPS orientation $\theta_{GPS}$ for the movement angle allows the movement angle and the position to be accurately calculated.

(4) The determination of the reliability of the GPS orientation data on the basis of the similarity between the variation in the GPS orientation $\theta_{GPS}$ and the navigation orientation $\theta_{Gyro}$ allows the movement angle to be accurately calculated.

(5) The determination of whether the GPS orientation $\theta_{GPS}$ is within the estimated range allows the movement angle to be accurately calculated.

Figure 7:
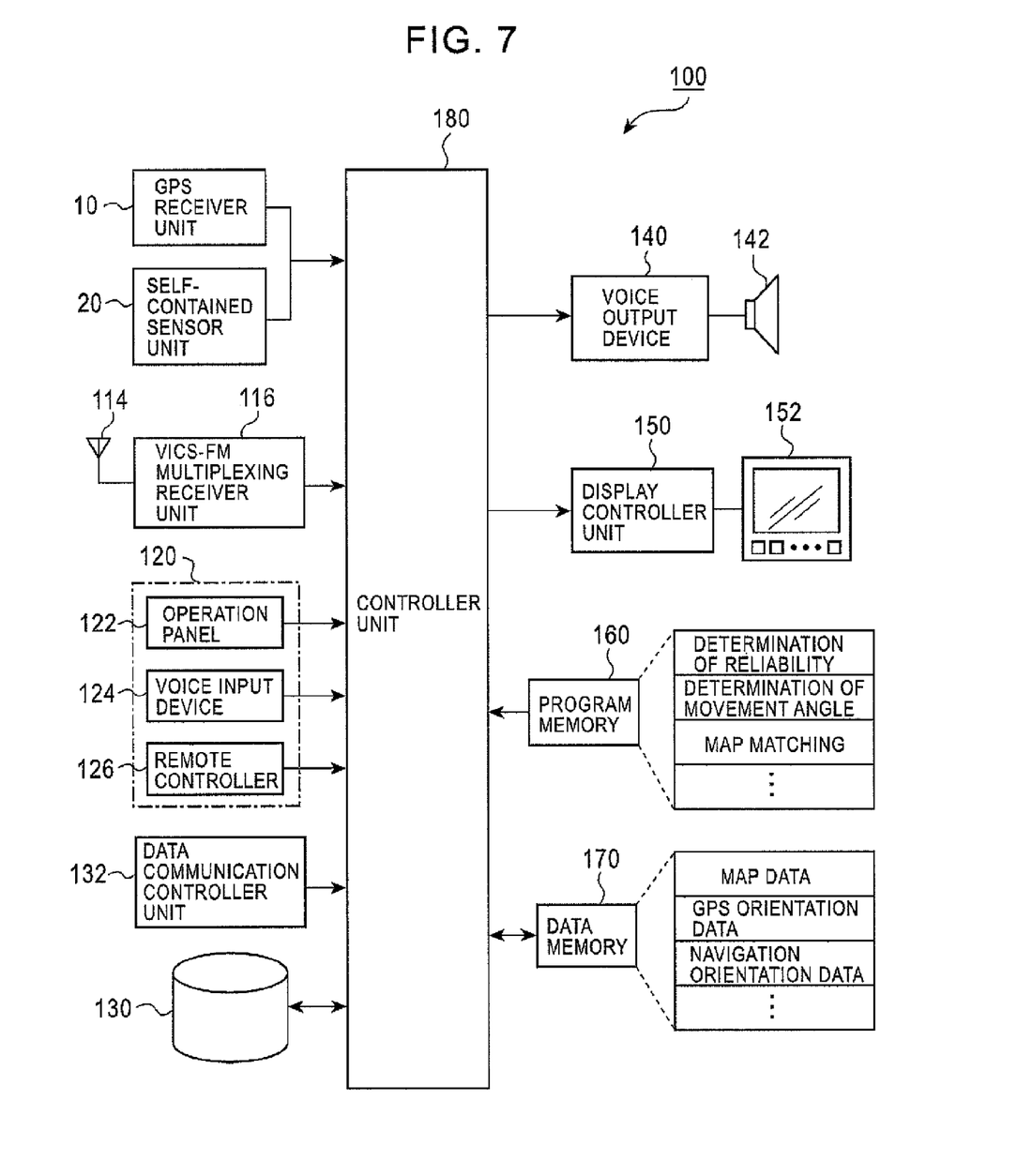
FIG. 7 is a block diagram showing an example of the structure of a navigation system to which the position calculating apparatus according to the embodiment of the present invention can be applied.

FIG. 7 is a block diagram showing an example of the structure of a navigation system 100 to which the position calculating apparatus according to the embodiment of the present invention is applied. The navigation system 100 includes a GPS receiver unit 10, a self-contained sensor unit 20, a Vehicle Information and Communication System (VICS) FM multiplexing receiver unit 116, a user input interface 120, a storage device 130, a data communication controller unit 132, a voice output device 140, a display controller unit 150, a program memory 160, a data memory 170, and a controller unit 180. The GPS receiver unit 10 receives radio waves from the GPS satellites. The VICS FM multiplexing receiver unit 116 receives the current road traffic information from outside the vehicle through an antenna 114. The user input interface 120 includes an operation panel 122, a voice input device 124, and a remote controller 126. The storage unit 130 includes a high-capacity hard disk. The data communication controller unit 132 is capable of data communication by radio waves or by wire. The voice output device 140 uses a speaker 142 to output voice. The display controller unit 150 controls a display device 152 so as to display an image. The program memory 160 has various programs stored therein. The data memory 170 temporarily stores data. The controller unit 180 has the function of determining a movement angle and the function of calculating a position, which the position calculating unit 30 in FIG. 1 is provided with.

Programs and databases used for performing various navigation functions are stored in the storage unit 130. The databases include map data and facility data. The map data includes link data and intersection data concerning a road. The program memory 160 loads the programs stored in the storage unit 130. The programs include a program used for map matching of the position of the vehicle calculated by the GPS positioning and the navigation positioning on the map data, a program used for searching for an optimal path to a destination, and so on. The map data read out from the storage unit 130, the positioning data from the GPS receiver unit 10 and the self-contained sensor unit 20, and so on are stored in the data memory 170.

Since the position of the vehicle can be accurately detected by the position calculating apparatus according to the embodiment of the present invention, it is possible for the navigation system 100 to reduce the processing load of the map matching and to accurately and rapidly display the position of the vehicle.

The position calculating apparatus according to the embodiment of the present invention may be used in a navigation apparatus for a moving body, such as a vehicle, and in a navigation system.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed) but that the invention will include all embodiments falling within the scope of the appended claims.

What is claimed is:

1. A position calculating apparatus that calculates a position of a moving body by using results of positioning by a GPS satellite and a self-contained sensor, the position calculating apparatus comprising:
   receiving means for receiving GPS orientation data measured by the GPS satellite and navigation orientation data measured by the self-contained sensor;
   first determining means for determining a reliability of the GPS orientation data;
   second determining means for determining a reliability of the navigation orientation data;
   movement angle calculating means for calculating a movement angle of the moving body from the GPS orientation data or the navigation orientation data in accordance with the determination results of the first and second determining means; and
   position estimating means for estimating a position of the moving body on the basis of a velocity vector calculated from the calculated movement angle and a speed based upon GPS satellite or self-contained sensor data.

2. The position calculating apparatus according to claim 1, wherein the first determining means uses at least one of a positioning state of the GPS satellite, a distance ratio between a traveling distance yielded from the results of the positioning by the GPS satellite and a traveling distance yielded from the results of the positioning by the self-contained sensor, a difference in movement angle between an angle between two points measured by the GPS satellite and the GPS orientation data, a similarity between the GPS orientation data and the navigation orientation data, and an estimated range with respect to the previous movement angle to determine the reliability of the GPS orientation data.

3. The position calculating apparatus according to claim 1, wherein the second determining means determines whether variation in the navigation orientation data has accumulated to a predetermined threshold or more.

4. The position calculating apparatus according to claim 1, wherein the movement angle calculating means uses the navigation orientation data to calculate the movement angle if the first determining means determines that the GPS satellite is unavailable or the moving body is stopped.

5. The position calculating apparatus according to claim 4, wherein the movement angle calculating means uses the GPS orientation data to calculate the movement angle if the first determining means determines that the GPS satellite is available and the moving body is moving and if the second determining means determines that the variation in the navigation orientation data has accumulated to a predetermined threshold or more.

6. The position calculating apparatus according to claim 5, wherein the movement angle calculating means uses the GPS orientation data to calculate the movement angle if the second determining means determines that the variation in the navigation orientation data has accumulated to a value below the threshold and if the first determining means determines that positioning conditions are met, the positioning conditions including at least one of determinations of whether the GPS positioning state is three-dimensional positioning, whether the GPS velocity is higher than or equal to a predetermined value, whether a distance ratio between a traveling distance yielded from the results of the positioning by the GPS satellite and a traveling distance yielded from the results of the positioning by the self-contained sensor is within a predetermined range, and whether a difference in the movement angle between an angle between two points measured by the GPS satellite and the GPS orientation data is smaller than or equal to a predetermined value.

7. The position calculating apparatus according to claim 6, wherein the movement angle calculating means uses the GPS orientation data to calculate the movement angle if the first determining means determines that any one of the positioning conditions is not met and the first determining means determines that the GPS orientation data is similar to the navigation orientation data and the GPS orientation data is within an estimated range.

8. The position calculating apparatus according to claim 1, wherein the receiving means receives the GPS orientation data and the navigation orientation data during the same traveling period of the moving body.

9. The position calculating apparatus according to claim 1, wherein the position estimating means sets an estimated range by using the previously calculated movement angle with respect to the previously calculated position to estimate the position of the moving body within the estimated range.

10. A method of calculating a position of a moving body by using results of positioning by a GPS satellite and a self-contained sensor, the method comprising:
receiving GPS orientation data measured by the GPS satellite and navigation orientation data measured by the self-contained sensor;
determining which orientation data has a higher reliability from a comparison of the reliability of the GPS orientation data with the reliability of the navigation orientation data;
calculating a movement angle of the moving body from either the GPS orientation data or the navigation orientation data which is determined to have a higher reliability; and
estimating a position of the moving body on the basis of a velocity vector calculated from the calculated movement angle and a speed based upon GPS satellite or self-contained sensor data.

11. The position calculating method according to claim 10, wherein the determining act includes a first determining act of determining the reliability of the GPS orientation data on the basis of a first condition, a second determining act of determining the reliability of the navigation orientation data on the basis of a second condition if the first determining act determines that the GPS orientation data is reliable, a third determining act of determining the reliability of the GPS orientation data on the basis of a third condition if the second determining act determines that the navigation orientation data is not reliable, and a fourth determining act of determining the reliability of the GPS orientation data on the basis of a fourth condition if the third determining act determines that the GPS orientation data is not reliable, and
wherein the calculating act calculates the movement angle on the basis of the navigation orientation data if the first determining act determines that the GPS orientation data is not reliable and if the fourth determining act determines that the GPS orientation data is not reliable and calculates the movement angle on the basis of the GPS orientation data otherwise.

12. The position calculating method according to claim 11, wherein the first condition includes at least one of determinations of whether the GPS satellite is unavailable and whether the moving body is stopped.

13. The position calculating method according to claim 11, wherein the second condition includes a determination of whether variation in the navigation orientation data has accumulated to a predetermined threshold or more.

14. The position calculating method according to claim 11, wherein the third condition includes at least one of determinations of whether three-dimensional positioning is available, whether a GPS velocity is higher than or equal to a predetermined value, whether a distance ratio between a traveling distance yielded from the results of the positioning by the GPS satellite and a traveling distance yielded from the results of the positioning by the self-contained sensor is within a predetermined range, and whether a difference in the movement angle between an angle between two points measured by the GPS satellite and the GPS orientation data is smaller than or equal to a predetermined value.

15. The position calculating method according to claim 11, wherein the fourth condition includes at least one of determinations of whether the GPS orientation data is similar to the navigation orientation data and whether the GPS orientation data is within an estimated range.

16. The position calculating method according to claim 11, wherein the receiving act receives the GPS orientation data and the navigation orientation data during the same traveling period of the moving body.

17. The position calculating method according to claim 10, wherein the estimating act sets an estimated range by using the previously calculated movement angle with respect to the previously calculated position to estimate the position of the moving body within the estimated range.

18. A program, for a navigation system, of calculating a position of a moving body by using results of positioning by a GPS satellite and a self-contained sensor, the program comprising:
receiving GPS orientation data measured by the GPS satellite and navigation orientation data measured by the self-contained sensor;

determining which orientation data has a higher reliability from a comparison of the reliability of the GPS orientation data with the reliability of the navigation orientation data;

calculating a movement angle of the moving body from either the GPS orientation data or the navigation orientation data which is determined to have a higher reliability; and updating a position of the moving body on the basis of a velocity vector calculated from (1) the calculated movement angle derived from either the GPS or navigation orientation data determined to have a higher reliability and (2) data concerning a speed of the moving body yielded from the GPS satellite or the self-contained sensor.

* * * * *